(No Model.)
A. DE THIERRY.
SADDLE.
No. 544,602. Patented Aug. 13, 1895.
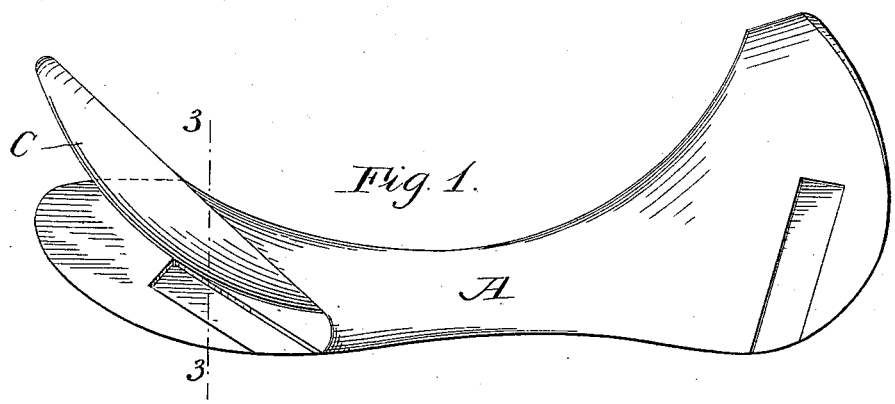
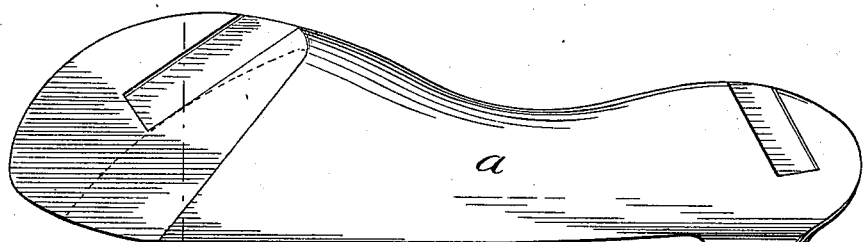
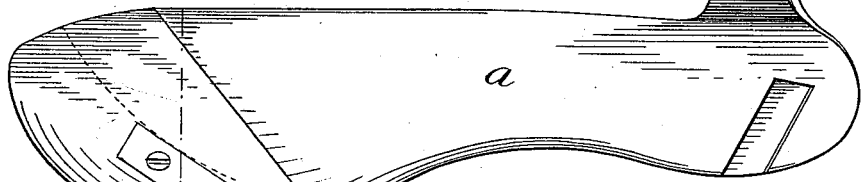
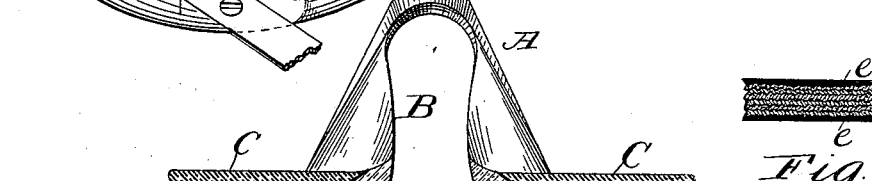
Witnesses,
Chas. W. Parker
Jos. H. Milans
Inventor,
Alph. de Thierry
by J. S. Barker
Atty.

UNITED STATES PATENT OFFICE.

ALPHONSO DE THIERRY, OF WASHINGTON, DISTRICT OF COLUMBIA.

SADDLE.

SPECIFICATION forming part of Letters Patent No. 544,602, dated August 13, 1895.

Application filed January 31, 1895. Serial No. 536,813. (No model.)

*To all whom it may concern:*

Be it known that I, ALPHONSO DE THIERRY, a citizen of the United States, residing at Washington, in the District of Columbia, have invented certain new and useful Improvements in Saddles; and I do declare the following to be a full, clear, and exact description of the invention, such as will enable others skilled in the art to which it appertains to make and use the same, reference being had to the accompanying drawings, and to the letters of reference marked thereon, which form a part of this specification.

In the manufacture of harness and riding-saddles, but more particularly riding-saddles, it is of the utmost importance that the saddle should conform to and closely fit the animal to which it is applied, and at the same time possess a shape attractive in appearance and easy for the rider. It is especially important that the saddle should fit the animal over the foreshoulders, because if too narrow it interferes with the respiration of the animal, especially when a heavy rider is in the saddle, besides rubbing and galling the surface, while if too broad it is difficult to keep the saddle in place. As no two animals are the same in shape, it has come to be a practice among manufacturers to construct saddles upon certain lines, which, from experience and observation, are found to conform closely to the average shape of a certain class of riding-animals or to an individual animal in such class taken as a type. As a result such saddles fit a few animals perfectly, a much larger number fairly well, and others very poorly or not at all. This difficulty in fitting a saddle to an animal comes from the fact that the saddle is stiff and rigid, and does not yield, so as to conform or adjust itself to the body of the animal when properly secured in place. This defect is attempted to be remedied by padding the saddle, but this recourse is only partially satisfactory and is open to serious objections. It has been proposed to make the saddletree adjustable to the animal by constructing it of leather or rawhide; but such attempts have been unsuccessful, and saddles so constructed have to be padded or else they do not fit even so well as does a wooden saddletree. In the first place a saddletree constructed of leather does not have, and cannot be made to have, the shape, both on its exterior and its under or interior surfaces, which enable it to conform to the animal and conduce to the comfort of the rider, as such shape requires differences of thickness in different parts of the tree, and such a saddletree does not possess a uniform and homogeneous flexibility throughout its entire extent, as the shaping of the leather in molds or otherwise to give form to the tree causes unequal flexibility, which is further increased by the glue, sewing, or riveting employed for uniting the pieces of leather which go to make up the saddletree. In the second place a leather saddletree deteriorates with age, becoming rigid and finally brittle. From those facts it follows that the leather saddletree possesses little if any advantage, so far as flexibilty is concerned, over the wooden tree, and it is far inferior thereto so far as shaping the saddle is concerned.

It is the object of my invention to construct a saddle which shall be shapely in its configuration and which shall be readily conformable to the animal to which it is applied.

With this object in view my invention consists of a saddletree having a shape or configuration upon its under surface or side to cause it to approximately fit or conform to the animal to which it is applied, and having its opposite side or surface shaped to give the proper configuration to the saddle, thereby insuring that the saddle shall have the desired appearance and shall also conduce to the greatest comfort of the rider, this shaping of the saddle requiring it to have different thickness in its different parts. In the further carrying out of my invention the saddletree thus shaped is so constructed as to be non-elastic and at the same time of uniform flexibility throughout its entire extent, its flexibility being sufficient to permit it to yield readily so as to conform both transversely and longitudinally to the back of the animal when the saddle-girth is drawn tight, while at the same time it has sufficient rigidity to give shape to the saddle, as above set forth, and to maintain such shape while the saddle is in use.

The invention further consists of certain features of construction in a saddle such as I have described, as will be hereinafter pointed out.

Such a saddletree as I have described I construct out of a material or fabric composed of vulcanized india-rubber, or its equivalent, and sheets or pieces of suitable woven or textile fabric, these materials being combined together and intermittently united during the process of molding or shaping the saddletree and the vulcanizing of the rubber, the resulting compound fabric being, as before stated, of homogeneous texture and uniform flexibility throughout—that is to say, the proportions of vulcanized rubber and textile fabric relative to each other being maintained in the different parts of the tree, so that where the tree is of greater thickness the number of superposed sheets or pieces of fabric is greater than where the tree is of less thickness. This construction necessitates the forming or construction of the fabric of which the tree is composed at the same time that the tree itself is made and shaped.

In order that my invention may be the better understood, I have illustrated one form thereof in the accompanying drawings without, however, wishing thereby to limit my invention to the particular form of saddle which, for the sake of illustration, I have shown as embodying the invention, for the reason that my invention is applicable to any of the usual forms of saddles, whether constructed for riding purposes or as gig or harness saddles.

In the said drawings, Figure 1 is a side view of a saddletree and cantle secured thereto made according to my invention. Fig. 2 is a plan view of the tree without the cantle. Fig. 3 is a transverse sectional view on the line 3 3 of Fig. 1. Fig. 4 is a detail view illustrating the fabric or material of which the saddletree is preferably composed.

In the said drawings, A represents the saddletree, which is made of material such as I have hereinbefore described and according to the process set forth. I prefer that the two side bars $a$ of the tree should be in one piece, connected together at their forward ends, leaving an open space B between them.

The cantle C, which is preferably made separable from the side bars, is made of a material similar to that used in constructing the other parts of the tree, although I prefer that it should have somewhat greater rigidity or stiffness and a corresponding less degree of flexibility than such other parts. This difference in flexibility may be secured by vulcanizing the rubber to such an extent as to be somewhat harder than is the rubber in the other parts of the tree. The cantle is, however, of uniform flexibility, and is homogeneous throughout, though it varies in thickness in its different parts, as shown in the drawings. The cantle may be secured to the side bars by cement or in any other desired way. The saddletree has secured to it the pommel, the means for securing the girth, and a suitable cover, which is usually of leather.

The compound fabric or material which I have described and of which the saddletree is composed is preferably covered with a coating $e$, Fig. 4, of pure vulcanized rubber, which serves to protect the textile parts of the fabric from moisture and the deterioration incident thereto.

The textile portions of the material which I employ render the saddletree non-elastic; and I have also found that tacks, nails, or screws which may be employed for securing the stirrup and girth straps will retain a firm hold in such material for an indefinite length of time.

Having thus described my invention, what I claim, and desire to secure by Letters Patent, is—

1. A saddle tree of varying thickness in its different parts whereby proper shape is given to the saddle, formed of a compound fabric or material of vulcanized rubber and sheets or pieces of woven or textile fabric, such compound material being homogeneous throughout, that is, the number of thicknesses of textile fabric increasing or diminishing according as the thickness of the saddle tree increases or diminishes, substantially as set forth.

2. A saddle tree formed of two side bars connected at their forward ends and of different thickness in their different parts, the said saddle tree being composed of a single piece of material, and being flexible and of homogeneous texture throughout, substantially as set forth.

3. In a saddle tree, the combination of the side bars of different thicknesses in their different parts and of homogeneous texture and uniform flexibility throughout, and a cantle secured to the side bars, the cantle being of homogeneous texture and uniform flexibility throughout, but the degree of flexibility of the cantle being less than that of the side bars, substantially as set forth.

4. A saddle tree composed of a fabric or material of varying thickness in its different parts, but at the same time having uniform flexibility and a homogeneous texture throughout, the said fabric being composed of pieces of textile fabric intimately united by vulcanized rubber, substantially as set forth.

In testimony whereof I affix my signature in presence of two witnesses.

ALPH. DE THIERRY.

Witnesses:
J. S. BARKER,
JOS. H. MILANS.